(12) United States Patent
Lee et al.

(10) Patent No.: US 6,944,680 B1
(45) Date of Patent: Sep. 13, 2005

(54) SMART HANDLE

(75) Inventors: William W. Lee, Boston, MA (US); Julian Pelenur, Marblehead, MA (US)

(73) Assignee: BEA Systems, Inc., San Jose, CA (US)

(*) Notice: Subject to any disclaimer, the term of this patent is extended or adjusted under 35 U.S.C. 154(b) by 781 days.

(21) Appl. No.: 09/689,429

(22) Filed: Oct. 12, 2000

Related U.S. Application Data

(60) Provisional application No. 60/158,686, filed on Oct. 12, 1999.

(51) Int. Cl.[7] .............................................. G06F 15/16
(52) U.S. Cl. ................... 709/249; 709/311; 709/315; 709/316; 709/326; 703/26; 703/27; 707/10; 719/311; 719/316; 719/326
(58) Field of Search ..................... 709/311, 315–316, 709/326, 249; 707/10; 703/26–27

(56) References Cited

U.S. PATENT DOCUMENTS

| | | | |
|---|---|---|---|
| 6,006,230 A | * 12/1999 | Ludwig et al. | ............... 707/10 |
| 6,178,457 B1 | * 1/2001 | Pitchford et al. | ........... 709/228 |
| 6,269,373 B1 | * 7/2001 | Apte et al. | ..................... 707/10 |
| 2002/0147696 A1 | * 10/2002 | Acker et al. | ................... 707/1 |

OTHER PUBLICATIONS

Tom Spitzer, The promise of EJB, )the Enterprise JavaBean specification is the centerpiece of Sun Microsystems' Java Platform for the Enterprise) (Company Business and Marketing). Aug. 1998.

Antone Gonsalves, Enterprise JavaBean Services Help Fill Void in the Middle, Aug. 1998.

Antone Gonsalves, Café lives on in WebGain Studio—BEA spinoff recast Symantec tools, (Product Announcement), Mar. 2000.

* cited by examiner

*Primary Examiner*—Valencia Martin-Wallace
*Assistant Examiner*—Mitra Kianersi
(74) *Attorney, Agent, or Firm*—Fulbright & Jaworski LLP

(57) ABSTRACT

A SmartHandle and method is provided which can extend capabilities of the EJB Handle. The SmartHandle can be mapped to a multi-column relational database. Additionally, the SmartHandle enables two EJB Handles to be compared without instantiating the actual EJB objects.

12 Claims, 2 Drawing Sheets

SMART HANDLE

RELATED APPLICATION

This application is a continuation-in-part of U.S. Provisional Patent Application Ser. No. 60/158,686 filed Oct. 12, 1999, which is hereby incorporated by reference in their entirety.

BACKGROUND OF THE INVENTION

Enterprise JavaBeans ("EJB") is a component architecture for creating scalable, multi-tier, distributed applications, and it makes possible the creation of dynamically-extensible application servers.

EJB provides a framework for components that may be "plugged in" to a server, thereby extending that server's functionality. Enterprise JavaBeans is similar to the original JavaBeans only in that it uses some similar concepts. EJB technology is governed not by the JavaBeans Component Specification, but by the Enterprise JavaBeans Specification, which is incorporated herein by reference in its entirety.

An Enterprise JavaBean is a component, just like a traditional JavaBean. Enterprise JavaBeans execute within an EJB container, which in turn executes within an EJB server. Any server that can host an EJB container and provide it with the necessary services can be an EJB server.

Turning now to FIG. 1, there is illustrated a typical EJB Architecture consisting of an EJB server 100, EJB containers 110 that run on these servers 100, EJBs that run in these containers, EJB clients 120 and other auxiliary systems like the Java Naming and Directory Interface (JNDI) and the Java Transaction Service (JTS).

EJB Servers 100 are analogous to the CORBA (Common Object Request Broker Architecture) ORB (Object Request Broker). An ORB is a component in the CORBA programming model that acts as the middleware between clients and servers. In the CORBA model, a client can request a service without knowing anything about what servers are attached to the network. The various ORBs receive the requests, forward them to the appropriate servers, and then hand the results back to the client. This provides the system services like a raw execution environment, multiprocessing, load balancing, device access, provides naming and transaction services and makes containers visible.

EJB Containers 110 act as the interface between an Enterprise Java Bean and the outside world. An EJB client 120 never accesses a bean directly. Any bean access is done through container-generated methods, which in turn invoke the bean's methods. The two types of containers are session containers that may contain transient, non-persistent EJBs whose states are not saved at all and entity containers that contain persistent EJBs whose states are saved between invocations.

The EJB container 110 is where the EJB components "lives". The EJB container 110 provides services such as transaction and resource management, versioning, scalability, mobility, persistence, and security to the EJB components it contains. Since the EJB container 110 handles all of these functions, the EJB component developer can concentrate on business rules, and leave database manipulation and other such fine details to the container. For example, if a single EJB component decides that the current transaction should be aborted, it simply tells its container and the container is responsible for performing all rollbacks, or doing whatever is necessary to cancel a transaction in progress. Multiple EJB component instances typically exist inside a single EJB container.

EJB Clients 120 make use of the EJB Beans for their operations. They find the EJB container 110 that contains the Bean through the Java Naming and Directory (JNDI) interface. They then make use of the EJB container 110 to invoke EJB Bean methods.

Client programs (EJB Clients 120) execute methods on remote EJBs by way of an EJB object 130. The EJB object 130 implements the "remote interface" of the EJB component on the server. The remote interface represents the "business" methods of the EJB component. The remote interface does the actual, useful work of an EJB object 130, such as creating an order form or deferring a patient to a specialist. EJB objects 130 and EJB components are separate classes, though from the "outside" (looking at their interfaces), they look identical. This is because they both implement the same interface (the EJB component's remote interface), but they do very different things. An EJB component runs on the server in an EJB container 110 and implements the business logic. The EJB object 130 runs on the client and remotely executes the EJB component's methods.

A code generation tool that comes with the EJB container 110 creates the actual implementation of an EJB object 130. The EJB object's interface is the EJB component's remote interface. The EJB object 130 (generated by the container and tools associated with the container) and the EJB component (generated by the EJB developer) implement the same remote interface. To the client, an EJB object 130 looks just like an object from the application domain—an order form, for example. But the EJB object 130 is just a stand-in for the actual EJB, running on the server inside an EJB container 110. When the client calls a method on an EJB object 130, the EJB object method communicates with the remote EJB container 110, requesting that the same method be called, on the appropriate (remote) EJB, with the same arguments, on the client's behalf. FIG. 1 is a pictorial representation of how an EJB client/server system operates.

There are two basic types of Enterprise JavaBeans: Session Beans and Entity Beans. These two types of Beans play different roles in a distributed EJB application. A Session Bean is an EJB instance 140 associated with a single client. Session Beans typically are not persistent (although they can be), and may or may not participate in transactions. A Session Bean can either have "states" or can be "Stateless," generally referred to as Stateful and Stateless Session Beans, respectively. In particular, session objects generally don't survive server crashes. One example of a session object might be an EJB living inside a Web server that serves HTML pages to a user on a browser, and tracks that user's path through the site. When the user leaves the site, or after a specified idle time, the session object will be destroyed. Note that while this session object might be storing information to the database 150, its purpose is not to represent or update existing database contents; rather, it corresponds to a single client performing some actions on the server EJBs.

Stateless Session Beans have no internal state and do not need to be passivated. Also, since they are stateless, they can be pooled in to service multiple clients. Whereas, Stateful Session Beans possess internal states. Hence they need to handle Activation and Passivation. Passivation is the process by which the state of a Bean is saved to persistent storage and then is swapped out. Activation is the process by which the state of a Bean is restored by swapping it in from persistent storage 150. Passivation and Activation apply to both Session and Entity Beans. However, there can be only one Stateful Session Bean per EJB Client 120. Since they can be persisted, the Stateful Session Beans can be served and restored across client sessions. To save the Bean's State, a call is made to the getHandle( ) method to get a Bean Object's handle. To restore a Bean from persistent storage, the getEJBObject( ) method is involving using the Bean Object's handle.

An Entity Bean represents information persistently stored in a database. Entity Beans are associated with database transactions, and may provide data access to multiple users. Since the data that an Entity Bean represents is persistent, Entity Beans survive server crashes (the server can reconstruct the Bean from the underlying data when it comes back online). In relational terms, an Entity Bean might represent an underlying database row, or a single SELECT result row. In an object-oriented database (OODB), an Entity Bean may represent a single object, with its associated attributes and relationships.

There are two types of persistence in Entity Beans, Container-managed persistence and Bean-managed persistence. For Container-managed persistence, the EJB container 110 is responsible for saving the Bean's state. Since it is container-managed, the implementation is independent of the data source. The container-managed fields need to be specified in the Deployment Descriptor and the container automatically handles the persistence. For Bean-managed persistence the Entity Bean is directly responsible for saving its own state. The container does not need to generate any database calls. Hence, the implementation is less adaptable than the previous one as the persistence needs to be hard-coded into the Bean.

An EJB client 120 creates EJB objects 130 on the server and manipulates them as if they were local objects. The developer creates, uses, and destroys EJB objects 130, but these EJB objects 130 have counterparts executing on a server that do the actual work. Session Beans manage information relating to a conversation between the client and the server, while Entity Beans represent and manipulate persistent application domain data. One way to conceptualize this is that Entity Beans replace the various sorts of queries used in a traditional two- or three-tier system, and Session Beans do everything else.

Every EJB has a unique identifier. For Entity Beans, this unique identifier forms the identity of the information. For example, an ProductIDNumber might uniquely identify a Product object. This is analogous to the concept of a primary key in a relational database system. A Session Bean's unique identifier is whatever distinguishes it from other Beans of its type: it may be the host name and port number of a remote connection, or even just a randomly-generated key that the client uses to uniquely identify a given Bean.

So, a client program contacts a server and requests that the server creates an Enterprise JavaBean to do data processing on its behalf. The server responds by creating the server-side object (the EJB component instance 140), and returning a proxy object (the EJB object 130) whose interface is the same as the EJB component's and whose implementation performs remote method invocations on the client's behalf. The client then uses the EJB object 130 as if it were a local object, "never knowing" that a remote object is actually doing all the work. The client program contacts the container to create an object on a server and requests that a particular type of object be generated, and the container responds with an EJB object 130 that can be used to manipulate the new EJB component.

Each EJB component class has what is called a home interface, which defines the methods for creating, initializing, destroying, and (in the case of Entity Beans) finding EJB instances 140 on the server. The home interface is a contract between an EJB component class and its container, which defines construction, destruction, and lookup of EJB instances 140.

An EJB home interface extends the interface javax.ejb.EJBHome, which defines base-level functionality for a home interface. All methods in this interface must be Java RMI-compatible (Remote Method Invocation-compatible), meaning that every method must be usable by the java.rmi package. RMI is a set of protocols developed by Sun's JavaSoft division that enables Java objects to communicate remotely with other Java objects. RMI is a relatively simple protocol, but unlike more complex protocols such as CORBA and DCOM (Distributed Component Object Model), it works only with Java objects. CORBA and DCOM are designed to support objects generated in any language. The EJB home interface also defines one or more create( ) methods, whose names are all create, and whose signatures are distinct. The return value of these object create methods is the remote interface for the EJB. As stated herein, the remote interface consists of the business methods the EJB provides.

When a client wants to create a server-side Bean, it uses the JNDI to locate the home interface for the class of Bean it wants. The JNDI is a standard extension to the Java core that provides a global service to any Java environment, allowing Java programs to locate and use resources by name, to find out information about those resources, and to traverse structures of resources.

Once the client has the home interface for the EJB class it wants to create, it calls one of the create( ) methods on the home interface to create a server-side object. The client-side home interface object does a remote method call to the EJB container on the server, which then creates the EJB component and returns an EJB object to the client. The client may then call the EJB object's methods, which are forwarded to the container. The container typically defers the implementation of the method to the EJB component, although it is also responsible for detecting some error conditions (such as nonexistence of the EJB component) and throwing appropriate exceptions.

Entity Beans also have additional home interface finder methods that locate individual persistent JavaBeans based on the Bean's primary key. The home interface might be used, for example, to create an instance of a ProductionFacility object, and then the finder method could be given the ProductionFacilityCode number to locate the object representing a specific facility.

Once the client has an EJB object 130, it can call that object's methods, which are implementations of the EJB component class's remote interface. An EJB remote interface extends the interface javax.ejb.EJBObject, and can define any method it wishes. The only restrictions are that the argument and return types for each method are RMI-compatible, and that each method must contain java.rmi.RemoteException in its throws clause. Furthermore, each method in an EJB remote interface must correspond exactly (that is, in name, argument number and type, return type, and throws clause) to a matching method in the Enterprise JavaBean component class the interface represents.

The javax.ejb.EJBObject interface defines methods that allow the client to do the following operations on an EJB object's reference: Obtain the home interface for the EJB class; remove the EJB object 130; obtain the EJB object's handle; and obtain the EJB object's primary key.

The container provides the implementation of the methods defined in the javax.ejb.EJBObject interface. The business methods are delegated to the enterprise Bean class.

A handle is an object that identifies an EJB object 130. A client 120 that has a reference to an EJB object 130 can obtain the object's handle by invoking getHandle( ) method on the reference.

Since the handle's class must implement the java.io.Serializable interface, a client may serialize it. The client may use the serialized handle later, possibly in a different process, to re-obtain a reference to the EJB object identified by the handle.

Containers that store long-lived entities will typically provide handle implementations that allow clients to store a handle for a long time (possibly many years). Such a handle will be usable even if parts of the technology used by the container (e.g., ORB, DBMS, server) have been upgraded or replaced while the client has stored the handle.

However, the EJB Handle as defined by EJB 1.0 Specification, which is incorporated herein in its entirety, cannot be mapped to a multi-column relational database table. Also, certain implementations of EJB Handle contain server IP address of the EJB object 130, which prevents the portability of the EJB object 130 between different locations. Further, comparison between two EJB Handles is impossible without instantiating the actual EJB object 130.

Accordingly, to address the shortcomings of the EJB Handle, the present invention provides "SmartHandle". SmartHandle extends the capability of EJB Handle.

OBJECTS AND SUMMARY OF THE INVENTION

Therefore, it is an object of the present invention to provide a SmartHandle, which extends the capabilities of the EJB Handle.

Another object of the present invention is to provide the SmartHandle as aforesaid, which can be mapped to a multi-column relational database table.

Further object of the present invention is to provide the SmartHandle as aforesaid, which stores the primary key of an EJB object instead of the Handle of the EJB object in the database.

Yet another object of the present invention is to provide the SmartHandle as aforesaid, which enables part comparison of two EJB Handles without instantiating the actual EJB object. Instantiation is the process of creating a new instance of an Entity EJB Object and reading all of its persistent attributes from the underlying database tables.

Various other objects, advantages and features of this invention will become readily apparent from the ensuing detailed description and the appended claim.

BRIEF DESCRIPTION OF THE DRAWINGS

The following detailed description, given by way of example, and not intended to limit the present invention solely thereto, will best be understood in conjunction with the accompanying drawings in which.

DETAILED DESCRIPTION OF THE INVENTION

Figure 1:
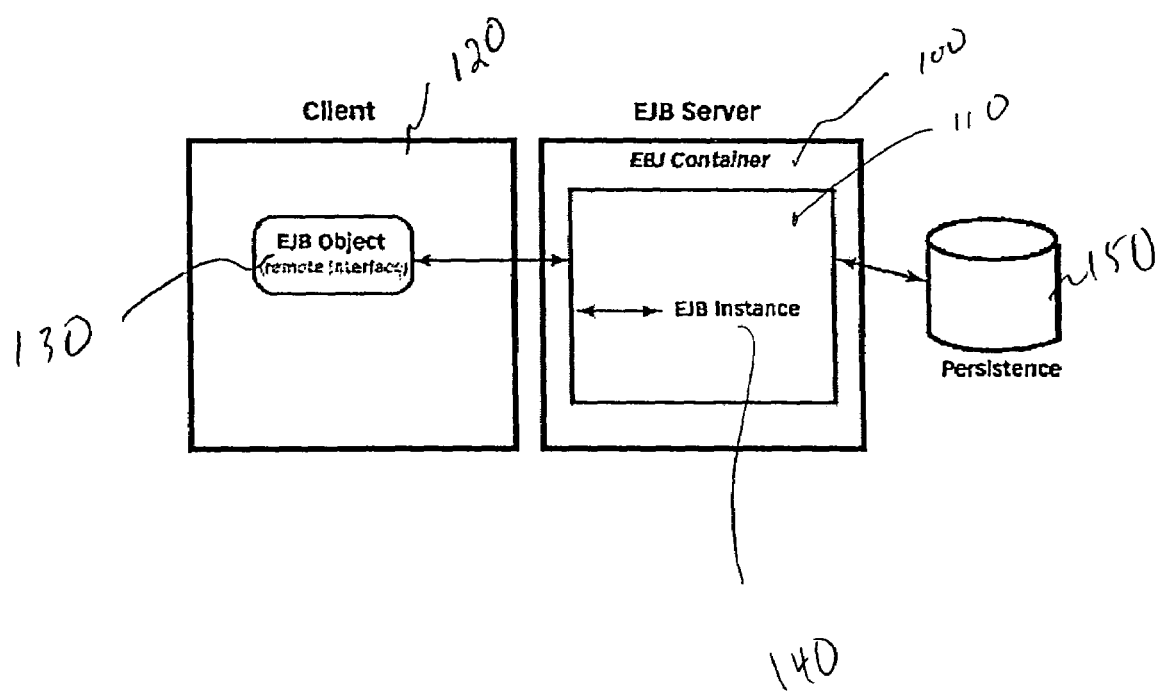
FIG. 1 is a block diagram of how a EJB client/server system operates.
Figure 2:
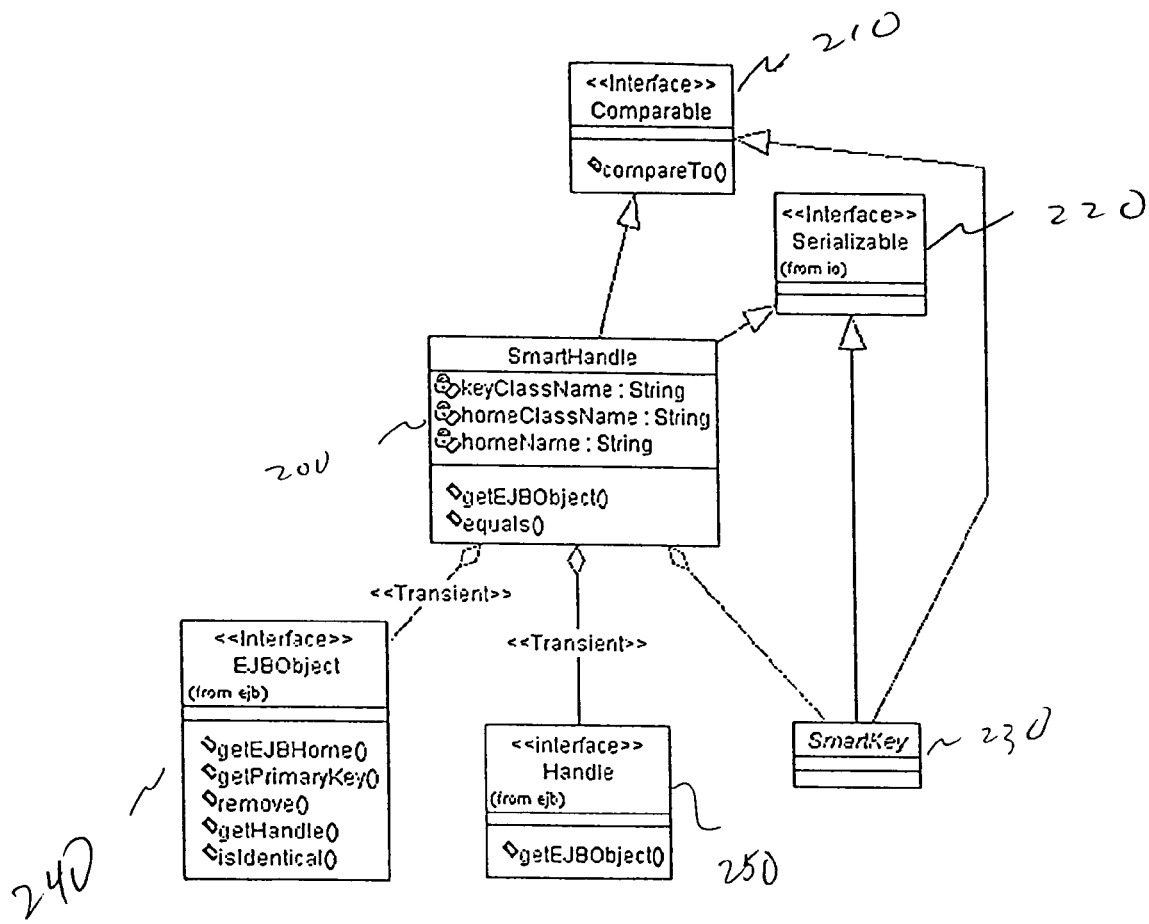
FIG. 2 is a static class diagram of a SmartHandle of the present invention in UML (Unified Modeling Language).

Turning now to FIG. 2, there is illustrated a SmartHandle of the present invention. A SmartHandle 200 is a Java class, and it is comparable 210 and serializable 220. The SmartHandle 200 has the following attributes: KeyClassName (of type String), HomeClassName (of type String) and HomeName (of type String). In addition, the SmartHandle contains, by reference, a reference to an instance of a SmartKey 230, a reference to a transient instance of an EJBObject 240 and a reference to a transient instance of a Handle 250. Transient attributes are nullified when the SmartHandle 200 is persisted. The SmartHandle 200 has, in addition to its inherited methods and lifecycle methods, a getEJBObject( ) method that returns the EJBObject and an equals( ) method used for comparison purposes.

The SmartHandle 200 maintains an Entity EJB object relationship by using a combination of the proxy pattern, EJB Handle, and primary key. A SmartHandle stores the name of the EJB Home class, or factory, from which an Entity EJB was generated and from which it can be re-instantiated. It also maintains an instance of the SmartKey 230 that describes the primary key for the database column(s) to which the entity object is mapped. A single method invocation instantiates the object that is referred to by the SmartHandle 200 by first looking up the Home class using the Java Naming and Directory Interface (JNDI), using reflection to obtain the ejbFindByPrimaryKey method, and then invoking that method with the persisted SmartKey 230.

The SmartHandle 200 is comparable in that it implements the java.util.Comparable interface and delegates to the contained SmartKey class that implements the java code to perform a field-by-field comparison of the attributes that make up the primary key. Therefore, two EJB Handles or SmartHandles can compared without incurring the overhead of instantiating the actual EJB objects. That is, the comparison can be performed without activating the EJB object.

The SmartHandle 200 is a serializable object such that it can be passed as a parameter to a remote method invocation and can be persisted into a column of an entity to which it is related.

The SmartKey interface extends the functionality that is required of the primary key classes as defined in the EJB specification and requires the implementation of the Comparable interface from the java collection API (application program interface). This enables the SmartKeys 230, and the SmartHandles 200 that contain them, to be easily compared and stored in ordered lists. The result is that it is easier to model relationships that require the ordering of Entities. Modeling is an application design methodology often used when creating EJB-based applications. By allowing EJBs to be easily compared (using the SmartHandles 200), it becomes easier to model relationships between EJB which require the ordering of entities.

The toString method of a SmartKey 200 simplifies the implementation of profiling and debugging code by making it possible to output all of the information needed to uniquely identify the Entity EJB with a single method invocation. This output then allows the programmer to debug and profile the application directly.

Since, the primary key can never be null, the present invention provides an EmptySmartKey as a way to represent a Primary Key that has not been initialized.

The SmartHandle has six private attributes. Attributes that are marked <<Transient>> will get persisted to the database. The following table describes each of the attributes.

| Scope | Per-sisted | Type | Name | Description |
|---|---|---|---|---|
| Private | No | Handle | Handle | The EJB Handle is not stored to the database. When an user of the SmartHandle wants to get a hold of the Handle, then the SmartHandle uses lazy evaluation to load it using SmartKey. |
| Private | No | EJBObject | EjbObject | The EJBObject is a cache for improving performance. SmartHandle uses EJBObject to get Handle. Because it is expensive to get the EJBObject, it is cashed. |
| Private | Yes | SmartKey | Smartkey | The SmartKey is the Primary Key for EJB object. |
| Private | Yes | String | KeyClassName | This is the class name of the Primary Key. |
| Private | Yes | String | HomeClassName | This is the class name of the EJB object's Home. |
| Private | Yes | String | HomeName | This is the name of the home that is bind to the Home Class inside JNDI. |

The SmartHandle 200 has standard gets for all of its attributes and the following is a list of the constructors of the present invention:

1) SmartHandle
   public SmartHandle( )

is a default constructor for SmartHandle that initializes all attributes to null. It creates an EmptySmartKey and assigns it to the SmartKey attribute.

2) SmartHandle
   public SmartHandle(Entity entity)

is a constructor for SmartHandle that takes in an Entity Bean. It initializes the attributes by getting the following information from the Entity Bean: SmartKey, HomeInterfaceClass, remoteInterfaceClass, primaryKeyClass, handle.

3) SmartHandle
   public SmartHandle(java.lang.String keyClassName,
      java.lang.String homeName,
      java.lang.String homeClassName,
      SmartKey smartKey)

is a constructor for SmartHandle that takes in PrimaryKey Classname, Homename, Home Classname and SmartKey. It assigns all the input parameters to its corresponding attributes.

4) compareTo
   public int compareTo(java.lang.Object o)

checks to see if two SmartHandles are equal. This is done by delegating the comparison work to its SmartKey. An EmptySmartKey always equals to another EmptySmartKey. Also, an EmptySmartKey is always less than a SmartKey.

Specified by: compareTo in interface java.util.Comparable 5) equals
   public boolean equals(java.lang.Object o)
   Overrides: equals in class java.lang.Object checks to see if two SmartHandles are equal. This is done by delegating the comparison work to the compareTo( ) method. An EmptySmartKey always equals to another EmptySmartKey, and different from a SmartKey.

6) getEJBObject
   public EJBObject getEJBObject( )
      throws java.rmi.RemoteException returns the EJBObject. If SmartHandle is empty (the smartKey attribute is EmptySmartKey), it returns null. Otherwise, it uses JNDI to lookup the EJB Home that its is bind to. Then it uses Java introspection to perform a "home.findByPrimaryKey( )" operation. The result of the operation is the EJBObject. It is cached to the ejbObject attribute.

7) getHandle
   public Handle getHandle ( )
      throws java.rmi.RemoteException returns the EJB Handle. If the SmartKey is empty, it returns null. Otherwise, it returns the cached value of the EJBHandle. If the cache is empty, then it uses getEJBObject( ) to get the EJBObject and then extracts the Handle from the EJBObject.

8) getSmartKey
   public SmartKey getSmartKey( )

returns the SmartKey. If the SmartKey is empty, it returns a theory.smart.foundation.EmptySmartKey The SmartHandle 200 of the present invention utilizes these constructors to extend the capabilities of the EJB Handle, including but not limited:

1) mapping to multi-column relational database table. The internal structure of the SmartHandle 200 allows for mapping it to a multi-column relational database table by assigning each attribute of the object and contained objects (such as the SmartKey 230) to a separate column within a relational database table.

2) storing the primary key rather than EJB Handle. The SmartHandle 200 contains the primary key of the EJB (inside its SmartKey object), thereby enabling the user to store the primary key instead of the EJB Handle. By storing the primary key and not other server-specific attributes (such as the IP address), the SmartHandle 200 advantageously provides portability to the EJB objects, which cannot be achieved using the standard EJB Handle.

3) fast comparison of two EJB Handles without instantiating the actual EJB object. In accordance with the present invention, the user can quickly and efficiently compare two EJBs by simply comparing their primary keys. Without the SmartHandle 200 of the present invention, a comparison between two EJB Handles is impossible without instantiating the actual EJB objects. This is because the programmer (or user) does not generally have access to the primary key of the object. Also, the client application carries a large performance penalty for instantiating the EJB objects. However, since the SmartHandle 200 contains the primary key of the object, the client application does not incur such performance penalty because the instantiation of the object is not necessary to compare the two EJB objects.

While the present invention has been particularly described with respect to the illustrated embodiment, it will be appreciated that various alterations, modifications and adaptations may be made based on the present disclosure, and are intended to be within the scope of the present invention. It is intended that the appended claims be interpreted as including the embodiments discussed above, those various alternatives, which have been described, and all equivalents thereto.

What is claimed is:

1. A method of extending EJB Handles for use with Enterprise JavaBeans (EJBs) to provide a SmartHandle, comprising the steps of:
   maintaining an Entity EJB object relationship through a combination of a proxy pattern, an EJB Handle, and a primary key of the EJB Handle;
   storing EJB Home class from which an Entity EJB was generated and from which said Entity EJB can be re-instantiated;
   maintaining an instance of a SmartKey that describes said primary key for a database column to which an Entity EJB object is mapped; and
   delegating to a SmartKey class that implements a java code to perform a field-by-field comparison of attributes associated with said primary key thereby permitting two EJB Handles to be compared without instantiating the corresponding Entity EJB.

2. The method of claim 1, further comprising the steps of instantiating said Entity EJB object associated with said SmartHandle with a single method invocation.

3. The method of claim 2, wherein said single method invocation includes the steps of:
   locating said EJB Home class using Java Naming and Directory Interface (JNDI);
   using reflection to obtain an ejbFindByPrimaryKey method; and
   invoking said ejbFindByPrimaryKey method with said SmartKey.

4. The method of claim 1, wherein said SmartKey includes said primary key of the EJB Handle, thereby providing portability to said Entity EJB object.

5. The method of claim 1, further comprising the step of assigning each attribute of said Entity EJB object and said SmartKey to a separate column within a relational database table, thereby permitting said SmartHandle to be mapped to a multi-column relational database table.

6. The method of claim 1, wherein said SmartHandle includes at least attributes HomeClassName, KeyClassName, and HomeName.

7. A SmartHandle for extending EJB Handles for use with Enterprise JavaBeans (EJBs), comprising:
   EJB Home class from which an Entity EJB was generated and from which said Entity EJB can be re-instantiated; and
   an instance of a SmartKey that describes said primary key for a database column to which an Entity EJB object is mapped; and
   wherein said SmartHandle maintains an Entity EJB object relationship through a combination of a proxy pattern, an EJB Handle, and a primary key of the EJB Handle and delegates to a SmartKey class that implements a java code to perform a field-by-field comparison of attributes associated with said primary key, thereby permitting two EJB Handles to be compared without instantiating the corresponding Entity EJB Objects.

8. The SmartHandle of claim 7, wherein said Entity EJB object associated with said SmartHandle being instantiated with a single method invocation.

9. The SmartHandle of claim 8, wherein said single method invocation is operable to locate said EJB Home class using Java Naming and Directory Interface (JNDI), use reflection to obtain an ejbFindByPrimaryKey method, and invoke said ejbFindByPrimaryKey method with said SmartKey.

10. The SmartHandle of claim 7, wherein said SmartKey includes said primary key of the EJB Handle, thereby providing portability to said Entity EJB object.

11. The SmartHandle of claim 7, wherein each attribute of said Entity EJB object and said SmartKey is assigned to a separate column within a relational database table, thereby permitting said SmartHandle to be mapped to a multi-column relational database table.

12. The SmartHandle of claim 7, wherein said SmartHandle includes at least attributes HomeClassName, KeyClassName, and HomeName.

* * * * *